United States Patent [19]

Blackmore

[11] Patent Number: 5,648,137
[45] Date of Patent: Jul. 15, 1997

[54] ADVANCED CURED RESIN COMPOSITE PARTS AND METHOD OF FORMING SUCH PARTS

[76] Inventor: Richard Blackmore, 914 Dell Rd., Northbrook, Ill. 60062

[21] Appl. No.: 287,120

[22] Filed: Aug. 8, 1994

[51] Int. Cl.[6] .................................................. B32B 3/06
[52] U.S. Cl. .......................... 428/102; 428/113; 428/408; 428/902; 442/388; 442/390
[58] Field of Search .................................. 428/102, 234, 428/300, 284, 285, 287, 246, 293, 294, 408, 902, 113, 252

[56] References Cited

U.S. PATENT DOCUMENTS

| | | |
|---|---|---|
| 1,960,120 | 5/1934 | Mohring . |
| 2,458,864 | 1/1949 | Lindsay . |
| 3,346,442 | 10/1967 | Carmody . |
| 3,390,951 | 7/1968 | Finger et al. . |
| 3,962,394 | 6/1976 | Hall . |
| 4,385,957 | 5/1983 | Wackerle et al. . |
| 4,510,219 | 4/1985 | Rowlette . |
| 4,560,428 | 12/1985 | Sherrick et al. . |
| 4,568,592 | 2/1986 | Kawaguchi et al. . |

(List continued on next page.)

FOREIGN PATENT DOCUMENTS

| | | |
|---|---|---|
| 0173446 | 3/1986 | European Pat. Off. . |
| A0378232 | 12/1989 | European Pat. Off. . |
| 605085 | 7/1994 | European Pat. Off. . |
| 5667217 | 6/1981 | Japan . |
| 6118920 | 5/1986 | Japan . |
| 150334 | 6/1990 | Japan . |
| 158313 | 6/1990 | Japan . |
| A3-212568 | 9/1991 | Japan . |
| 109194 | 4/1994 | Japan . |
| 945911 | 1/1964 | United Kingdom . |
| WO85/03906 | 12/1985 | WIPO . |
| PCT/US92/07751 | 11/1992 | WIPO . |
| WO93/0641 | 4/1993 | WIPO . |

OTHER PUBLICATIONS

"Electrically Conductive Non–Metallic Textile Coatings" by R.V. Gregory, W.C. Kimbrell and H.H. Kuhn, reprinted from Journal Of Coated Fabrics, vol. 20—Jan. 1991.

"Update on Electrically Conductive Polymers and Their Applications" by K.F. Schoch, Jr., IEEE Electrical Insulation Magazine May/Jun. 1994—vol. 10, No. 3, pp. 29–32.

"Trickle Impregnating with Polyester Resin to Maximize the Quality of Wound Components in High Volume Production Lines" by Len Goodyer, IEEE Electrical Insulation Magazine Jul./Aug. 1994—vol. 10, No. 4, pp. 6–9.

The Scrimp™ Systems advertising brochure.

"Processing of Carbon Fiber Reinforced Plastics by Means of Joule Heating" by Hiroshi Fukuda, *Adv. Composite Mater.*, vol. 3, No. 3. pp. 153–161 (1994).

Primary Examiner—James J. Bell
Attorney, Agent, or Firm—Wallenstein & Wagner, Ltd.

[57] ABSTRACT

A unique composite material impregnated with a heat curable resin comprising a layer of conductive fibers and one or more resin carrying layers is utilized to reinforce utility poles by wrapping the material around a portion of the utility pole and causing a current to flow through the conductive fibers to resistively heat the material to the resin. The composite material can also be incorporated into molds to produce cured composite parts. The composite material is also used in the construction of large parts without the need for huge, expensive molds. The conductive fibers in composite parts are oriented in a manner to ensure that the entire part is thoroughly heated during the curing process.

23 Claims, 8 Drawing Sheets

U.S. PATENT DOCUMENTS

| | | |
|---|---|---|
| 4,609,449 | 9/1986 | Morin . |
| 4,624,751 | 11/1986 | Morin et al. . |
| 4,661,403 | 4/1987 | Morin . |
| 4,668,545 | 5/1987 | Lowe . |
| 4,708,527 | 11/1987 | Inhofe, Jr. et al. . |
| 4,838,971 | 6/1989 | Cacak . |
| 4,861,634 | 8/1989 | Renard . |
| 4,874,454 | 10/1989 | Talalay et al. . |
| 4,874,548 | 10/1989 | Hajovsky . |
| 4,902,215 | 2/1990 | Seemann, III . |
| 4,904,351 | 2/1990 | Morin . |
| 4,909,910 | 3/1990 | Morin . |
| 4,966,729 | 10/1990 | Carmona et al. . |
| 4,972,880 | 11/1990 | Strand . |
| 4,976,828 | 12/1990 | Morin . |
| 4,980,008 | 12/1990 | Woods et al. . |
| 4,994,518 | 2/1991 | Morin et al. . |
| 4,995,761 | 2/1991 | Barton . |
| 4,997,511 | 3/1991 | Newsom . |
| 5,010,440 | 4/1991 | Endo . |
| 5,027,575 | 7/1991 | Owen . |
| 5,043,033 | 8/1991 | Fyfe . |
| 5,052,906 | 10/1991 | Seemann . |
| 5,147,714 | 9/1992 | Ellison et al. . |
| 5,182,134 | 1/1993 | Sato . |
| 5,199,463 | 4/1993 | Lippiatt . |
| 5,248,864 | 9/1993 | Kodokian . |
| 5,286,417 | 2/1994 | Mahmoud et al. . |
| 5,316,462 | 5/1994 | Seemann . |
| 5,326,410 | 7/1994 | Boyles . |
| 5,326,636 | 7/1994 | Durand et al. . |
| 5,451,351 | 9/1995 | Blackmore . |

ADVANCED CURED RESIN COMPOSITE PARTS AND METHOD OF FORMING SUCH PARTS

DESCRIPTION

1. Technical Field

The present invention relates generally to advanced composite material parts impregnated with a heat curable resin system and including a conductive layer integrally consolidated into such composite material prior to curing of the resin, and to a method for producing such parts.

2. Background of the Invention

The technology of producing composite material components or parts, which include a heat curable resin system, is polarized. At one end of the scale, there exists low cost, low quality, "engineered" composites. While at the other end, high quality "advanced" composite materials are extremely costly to produce. Such advanced composite materials are highly desirable for use in many applications due to their high strength, low weight, and other beneficial physical properties. Accordingly, a genuine need exists for methods of forming advanced composite material parts at a lower cost.

One reason some advanced material composites are extremely expensive is that only high performance materials, such as kevlar or graphite, are used to produce such parts. These materials can be very expensive. Additionally, for many applications, expensive molds are required to heat the composite materials to cure a high temperature resin system impregnated in such materials. Alternatively, cumbersome heating blankets can be used. Such blankets are difficult to apply in many applications to thoroughly heat a part, and are inefficient in that much of the heat produced by such blankets is dissipated into the atmosphere. Although lower temperature resin systems can be used (i.e., ambient curing), it is difficult to consistently produce a large number of high quality parts with such systems. This is due to the fact that such systems are dependent on ambient conditions which can vary widely and disrupt the curing cycle.

One attempt to provide an improved method of curing composite material is disclosed in U.S. Pat. No. 4,560,428 to Sherrick et al. In this patent, a layer of conductive carbon or graphite fibers is placed adjacent a composite material patch which is used for repair of a parent structure. The conductive fiber layer is resistively heated to cure a resin impregnated in the patch and to trigger a heat activated adhesive to bond the patch to the parent structure. The conductive fiber layer may then be removed, or in some applications can become bonded to and form part of the patch. However, Sherrick et al. does not provide any teaching of forming a completed composite material part, separate from a parent structure, or of utilizing a composite material having a conductive layer which is integrally consolidated with the composite material prior to curing of the resin in such composite material. Further, Sherrick et al. does not disclose the use of a composite material having an integral conductive layer in as a reinforcing structure.

The composite industry needs low-cost advanced composite material parts and low-cost methods of producing such parts. The present invention provides a low-cost method of consistently producing composite material parts having desirable physical properties. Additionally, the present invention also provides unique low-cost composite materials for use in such methods.

SUMMARY OF THE INVENTION

One aspect of the present invention comprises a method of reinforcing structural components such as utility poles. A pole or other structural component which requires reinforcement is wrapped with a composite material which is impregnated with a heat curable resin, and which includes at least one layer of electrically conductive material such as a graphite fiber fabric, a carbon black glass fabric, or a conductive polymer coated nylon or polyester fabric. The conductive layer is integrally consolidated into the composite material. This is preferably done by needle punching the material. The composite material is fastened to the structure by means of staples, metal bands, plastic ties or other suitable fastening devices. An inflatable bladder is then wrapped around the composite material and is fastened to the structure. Hook and loop material, metal bands or other similar fastening means may be used to fasten the bladder around the composite material. The bladder is inflated to compress the composite material against the structure until the resin is cured. An electric current is then caused to flow through the conductive layer sufficient to resistively heat the composite material to cure the impregnated resin.

This method is particularly useful for reinforcing the base area of wooden utility poles. In this situation, lines are used to first secure the pole in an upright position, and a portion of the pole below ground is then exposed. The composite material is then wrapped around the exposed portion and a portion slightly above ground level. This area typically is the weakest part of the pole due to stress and deterioration. A power source, such as a generator, is then connected by conductive leads to metal bands, which act as electrical contacts, which are connected to the conductive layer of the composite material. The compressive bladder is then put in place and inflated. The generator is then operated to cause an electric current to flow through the composite material. After a cure cycle of approximately 30–90 minutes, the bladder is removed, the leads are disconnected, and the exposed portion of the pole is reburied.

Another aspect of the invention is utilized in the manufacture of plastic composite material parts using curing molds formed from the same or similar composite material, and which include a layer of conductive material. Use of such molds provide for the manufacture of higher quality, more consistent parts. This is because the thermal expansion and contraction characteristics (i.e., during the heating and cooling portions of the curing cycle respectively) of the mold match those of the composite material being cured. In this manner, the mold applies a consistent compressing, holding force to the part during the curing process. Unlike prior metal molds, the part will not peel away from the mold during the curing cycle due to thermal expansion or contraction of the part which is greater or less than the expansion or contraction of the mold. Such unmatched thermal expansion and contraction characteristics can result in warped, damaged parts. In operation, the conductive layers in the mold and the conductive layers in the composite material are resistively heated to cure the resin in the material.

Another aspect of the invention is utilized in the manufacture of large composite material parts, such as boat hulls, trailer side walls, and building walls. Prior to this invention, such parts were typically laid in an open mold and utilized a low temperature resin system which depended on ambient conditions to cure. Such resin systems were not effective in consistently producing these large parts, since cold and hot ambient conditions unsatisfactorily effected the curing cycle. However, higher temperature resin systems are not widely used due to the difficulty of heating such parts. Large closed molds capable of heating the composite material to cure the resin, as well as other heating means such as metal blankets, are not prevalent due to their extreme cost.

According to the present invention, a large composite material impregnated with a heat curable resin, and which includes a layer of conductive material integrally consolidated into the composite material is first placed in an open mold. A flexible membrane is then placed over the part and a vacuum is effected between the part and the membrane in order to apply pressure to the part. An electric current is then caused to flow through the conductive layer to resistively heat the composite material to cure the resin. An open mold formed from the same or similar composite material as the part, and having a layer of conductive material can also be used in the manner described above to achieve matched thermal characteristics between the mold and the part.

Another aspect of the invention is utilized in the production of hollow composite material parts. A composite material impregnated with a heat curable resin, and which includes a layer of conductive material, is wrapped around an expandable mandrel or bladder, and is placed in an outer shell. The mandrel is then expanded to compress the composite material between the mandrel and the shell. An electric current is then caused to flow through the conductive layer to resistively heat the composite material to cure the resin. The part is then removed from the shell and the mandrel is collapsed and removed. This method can be used to create composite material tubing and other hollow shapes. If a rectangular outer shell is used, composite material railroad ties can be produced. For those applications which require greater resistance to compressive forces, the composite material part may be injected with a structural hardening foam.

In yet another aspect of the invention, a more effective cure of a composite material part having a layer of conductive material in the form of conductive fibers which are integrally consolidated as part of the composite material, can be had by orienting the fibers in a manner to achieve the greatest resistive path with the smallest and fewest required electrical contacts. This can be done with the most efficient use of the conductive fabric by forming the generally parallel, machine direction fibers in a woven material, at an oblique angle with respect to the generally parallel stitch bonding or cross-machine fibers of the material. Either set of these fibers can act as conducting fibers in the fabric. Previously, machine direction fibers are typically formed perpendicular to the stitch bonding fibers.

The conductive fabric can then be combined with other materials, such as non-woven polyester fabrics, to form a composite material. One application that benefits from having the conducting fibers of the fabric at an oblique angle is for a parallelogram-shaped composite materials. For such shapes, if electrical contacts are placed on either side of the parallelogram, fabrics which have fibers running perpendicular to each other cannot be effectively used to create a resistive path throughout the entire part. However, by orienting the conducting fibers at an angle corresponding to the sides adjacent the electrical contacts, a more complete resistive heating of the part can be effected.

A similar principle can also be applied to parts having more than one layer of conductive fibers, regardless of the shape of the part. If the conducting fibers in one layer are at an angle with respect to the conducting fibers in a second layer, a more consistent, effective cure is achieved because it is less likely that cold spots in the composite material will occur.

The composite material parts of the present invention can be formed from a combination of materials to achieve a high performance, strong, lightweight part at a fraction of the cost previously obtainable for such high quality composites. Part of this reduction in cost is due to the highly efficient method of curing the part through resistive heat in a conductive layer. Also, it has been found that cheaper materials, such as non-woven polyesters can be advantageously combined with higher performance materials to achieve extremely strong parts.

The basic composite structure of the present invention includes at least one resin carrying layer, and at least one conductive layer. In one preferred form, a conductive fiber layer is placed between a first resin carrying layer, and a second resin carrying layer. The layers are then preferably needle punched to consolidate the layers into a single material. The needle punching operation places a number of fibers in the depth direction of the composite material which enhances its strength in that direction. However, other means, such as knitting, braiding, or stitch bonding the layers together may be used.

Another preferred form of the composite material includes a first resin carrying layer, a second layer of conductive fibers, a third resin carrying layer, a fourth layer of conductive fibers, and a fifth resin carrying layer. As above, the layers are consolidated into a single fabric by needle punching or by other means. The resin carrying layers are preferably non-woven polyester or other less expensive materials. The conductive layers are preferably woven graphite fibers, or conductive polymer coated fabrics such as a high quality nylon. The conductive layers are preferably formed of high performance material to add strength to the part when cheaper materials are used for the resin carrying layers. It has been found that separating the conductive layers with a resin carrying layer (i.e., the third layer in this composite), the strength of the resulting part is much greater than if the conducting layers were immediately adjacent to each other.

As discussed above, the conducting layers are preferably formed having a plurality of parallel conducting fibers. In one embodiment of the invention, the two conductive layers in the composite material are positioned so that the conducting fibers in one layer are at an angle with respect to the conducting fibers in the second layer.

Further aspects of the invention are described in the detailed description or shown in the Figures.

DETAILED DESCRIPTION OF PREFERRED EMBODIMENTS

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Utility Pole Reinforcement

One embodiment of the present invention is utilized to reinforce and strengthen poles or other structural supports or beams. This is of particular use with wooden utility poles, such as telephone poles or poles supporting power lines. Additionally, poles in the form of concrete columns, such as bridge supports, can be reinforced with this method.

Wooden utility poles are subject to stress and deterioration which can shorten the useful life of the pole. This is particularly evident at ground level where pressures build due to movement between the exposed, above ground portion of the pole and the fixed, secured portion of the pole below ground. Such movement can be due to wind, or pressure from the telephone or power lines attached to the pole. Additionally, water damage, which may cause rot, is more prevalent at the base of the pole where water can collect and sit for long periods of time. Further, water seeping into the pole can freeze during periods of cold weather causing the pole to expand slightly. This can loosen the pole from the ground when the ice later melts.

Wooden utility poles are costly and difficult to replace. In fact, many poles are chemically treated and require special handling when removed and replaced with new poles. Accordingly, it is desirable to provide relatively inexpensive structural reinforcement to extend the life of such poles.

In the past, composite materials have been wrapped around the base of such poles, and have then been impregnated on site with a resin system which cures at a relatively low temperature (e.g., about 77° F.). This is typically referred to as an ambient cure system since only ambient temperature is used to cure the resin. A sleeve is wrapped around the composite and the resin system is poured into the sleeve. The sleeve is then tightened causing the resin to migrate through the composite material. This procedure has several problems since it is dependent on the ambient temperature. If it is too cold, the resin will not cure and may migrate to the bottom of the composite before the temperature rises sufficiently to cure. If it is too hot, the resin may cure before it is in place. Both situations are undesirable.

Attempts have been made to utilize a resin system with a higher cure temperature (e.g., 125°–150° F.) and to preimpregnate the composite materials before wrapping it around the pole. Such materials are easier to handle than those which are impregnated on site. With such systems, it is necessary to provide some means to heat the composite material in order to enable the resin to cure. Heating blankets made of copper were used in efforts to obtain the required temperature in the composite material. However, heating blankets were cumbersome and difficult to apply in the field. Additionally, they required a great deal of power since much of the heat was dissipated into the atmosphere, and had to be left in place for long periods of time in order to ensure that the entire composite material was heated sufficiently. The present invention overcomes the problems associated with these other methods.

Figure 1:
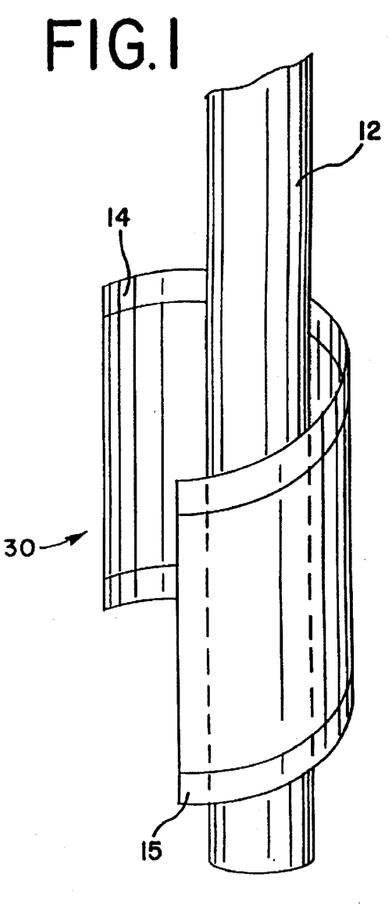
FIG. 1 discloses a perspective view of a composite material being placed around a pole in accordance with one embodiment of the invention.

In accordance with the present invention, FIG. 1 discloses a composite material 10 which can be wrapped around a utility pole 12 to reinforce and strengthen the pole 12. As a preliminary matter, the pole is first secured in place by tying securement lines (not shown) to an upper portion of the pole 12 and staking the lines to the ground. Three to four lines in opposed directions are typically sufficient. The base of the pole is then evacuated in order to expose about a four foot section of the pole previously underground, and to allow sufficient access to the area to be reinforced (this is one reason it is necessary to first secure the pole). In a typical utility pole about one third of its length is below ground level.

The composite material 10 is formed having one or more resin carrying layers and at least one layer of conductive material. The conductive layer is formed as an integral component of the composite material 10 prior to the curing operation described below. Preferably the conductive layer is in a fabric form and comprises a plurality of generally parallel, electrically conductive fibers. The composite material 10 is previously impregnated with a heat curable resin system. Preferred forms of the composite material and resin systems are described in greater detail below. The composite material 10 is approximately seven feet in length and approximately seven feet wide (for utility poles which have a typical circumference of approximately six feet). The composite material 10 includes a first contact 14 and a second contact 15 at either end of the material. The contacts 14,15 may be copper bands or other conductive materials, and are in electrical contact with exposed portions of the conductive layer of the composite material. Alternatively, the contacts 14,15 can be added to the composite material 10 after it is secured to the pole 12.

The composite material 10 is wrapped around the four foot exposed portion of the pole 12 as well as approximately three feet of the pole immediately above ground level. The composite material 10 is then secured in place around the pole 12. Preferably, the composite material is secured by stapling it to the pole; however other means, such as, metal bands or plastic ties can be used.

Figure 2:
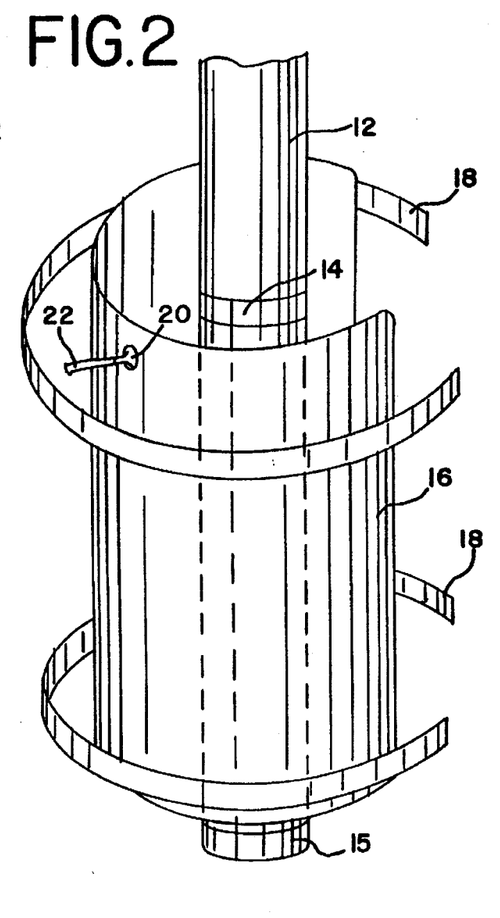
FIG. 2 discloses a perspective view of an inflatable bladder being placed around the composite material of FIG. 1.
Figure 3:
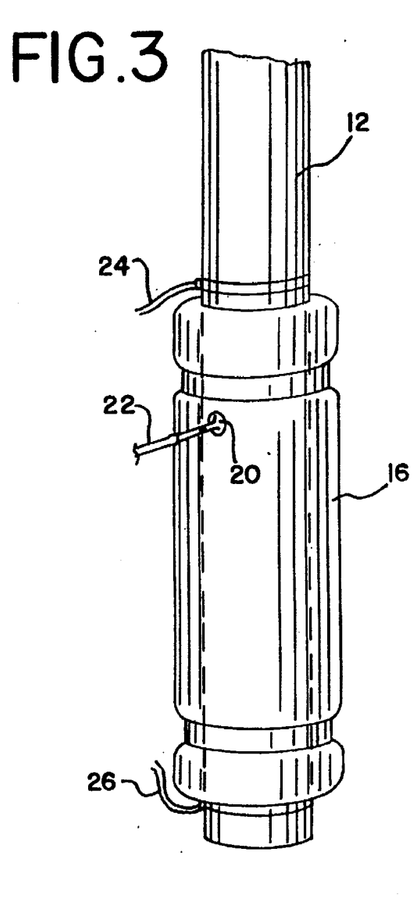
FIG. 3 discloses a perspective view of the bladder and composite of FIGS. 1 and 2 in place around the pole.

After the composite material 10 is in place, an inflatable bladder 16, as shown in FIGS. 2 and 3, is wrapped around the composite material 10 and secured in place using metal bands 18, or other suitable means such as strips with hook and loop material. The bladder is preferably formed from a heat stabilized nylon or silicon film. One such film having 50% nylon #6 and 50% nylon #66 from Allied Signal can be used. The bladder 16 includes a nozzle 20 connected to a hose 22 which, in turn, is connected to a pump (not shown). The bladder 16 is inflated to apply approximately 5–10 pounds per square inch of pressure to the composite material 10. This helps insure a tight fit between the composite material 10 and the pole 12 after the resin cures.

To cure the resin, a power generator (not shown) having a first lead 24 and a second lead 26 is provided. As shown in FIG. 3, the first lead 24 is connected to the first contact 14 and the second lead 26 is connected to the second contact 15 to create an electric circuit. Depending on the size of the bladder, the leads 24,26 from the power generator may have to be connected to the contacts 14,15 before the bladder is put in place. The generator is then turned on to cause a current to flow through the conductive layer of the composite material 10 to resistively heat the composite material 10 for a period of 30–90 minutes. A sufficient current is applied to the conductive layer of the composite material 10 in order to heat the composite material 10 to a temperature to cure the impregnated resin. Although either alternating current or direct current may be used, it has been found that direct current provides a more even resistive heating of the composite material.

One preferred form of a power generator includes a combination of a buck/boost transformer, an auto transformer, a direct current rectified transformer and a VARIAC. These components can be utilized to provide a proper voltage to the conductive layer of the composite material.

It has been found that approximately 3–3½ volts per foot of length and approximately 7–10 amps per inch of diameter is required to heat the composite material 10 to 250° F. Accordingly, for the dimensions of the composite material 10 disclosed in FIG. 1, approximately 15–20 kilowatts of power is required. The composite material 10 is preferably raised to 250° F. in order to ensure that there are no cold spots in the composite material during the curing stage.

After the curing cycle, the bladder 16 and the leads 24,26 can be removed and the evacuated exposed portion of the pole can be filled in.

Figure 4:
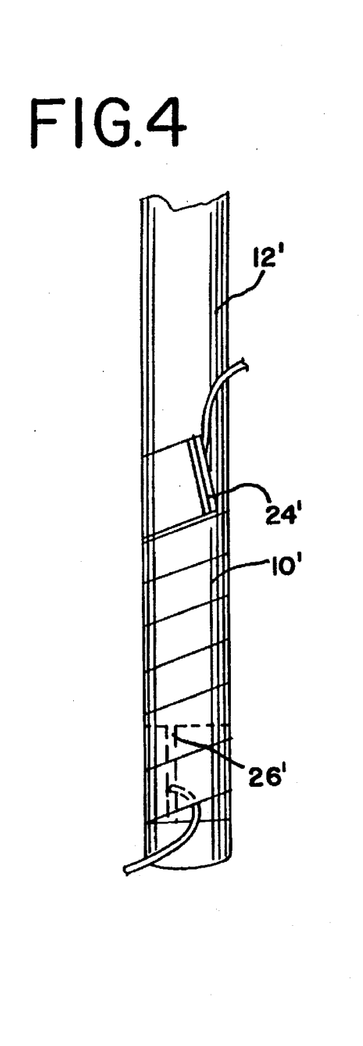
FIG. 4 discloses a perspective view of a second embodiment of the composite material of FIG. 1 wrapped around a pole in a spiral fashion.
Figure 5:
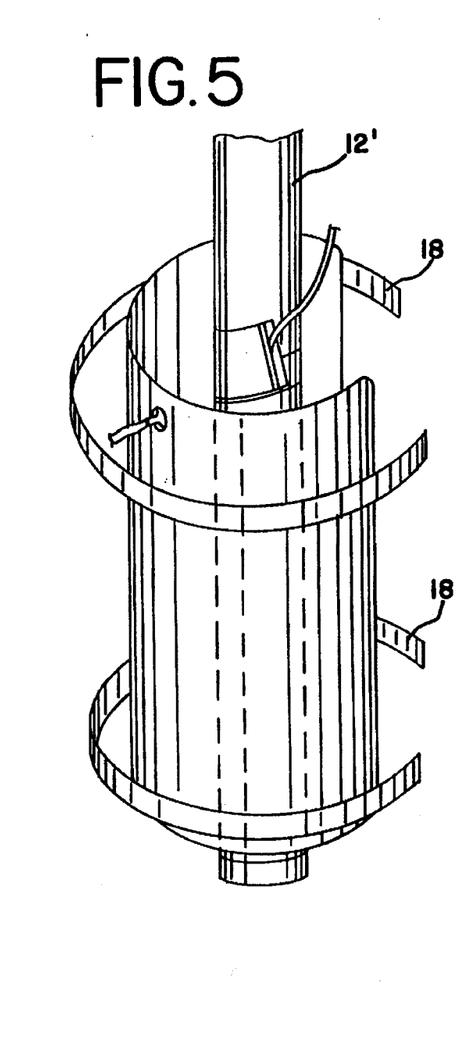
FIG. 5 discloses a perspective view of a bladder being placed around the composite material of FIG. 4.
Figure 6:
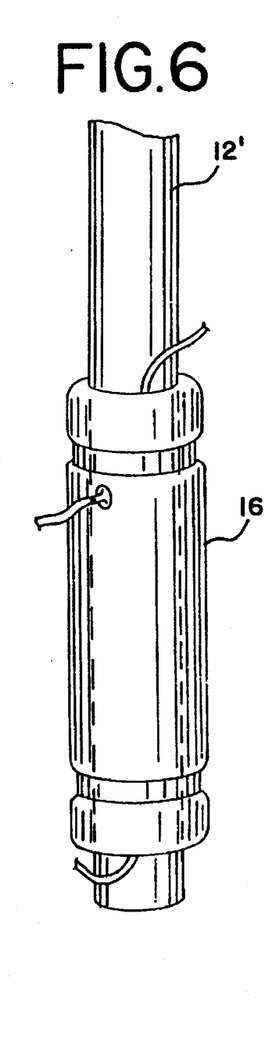
FIG. 6 discloses a perspective view of the bladder and composite material of FIGS. 4 and 5 in place around the pole.

In a second embodiment shown in FIGS. 4–6, the composite material 10' is approximately 50 feet in length and 30 inches wide. The composite material 10' is wrapped around the pole 12' in spirals having approximately 8 inches of overlapping material for each loop around the pole 12'. Contacts 24' and 26' are placed at either end of the composite material 10'.

Although the second embodiment utilizes more square feet of material than the first embodiment describe above, the resulting structural reinforcement will be stronger than that provided in the first embodiment described above due to the overlapping of the composite material 10'. Additionally, in this form it has been found that only about 7–8 kilowatts of power is required to resistively heat the composite material 10' to cure the resin. Accordingly, a smaller generator is needed to resistively heat the composite material 10'.

Matched Mold Parts

Another aspect of the present invention can be utilized in the production of structural cured composite parts using a unique mold and curing procedure. Matched mold halves constructed with a conductive layer similar to the composite materials of the present invention, and designed to have specific thermal and electrical properties can be utilized to effect a more efficient cure and achieve a more uniform part.

Figure 7:
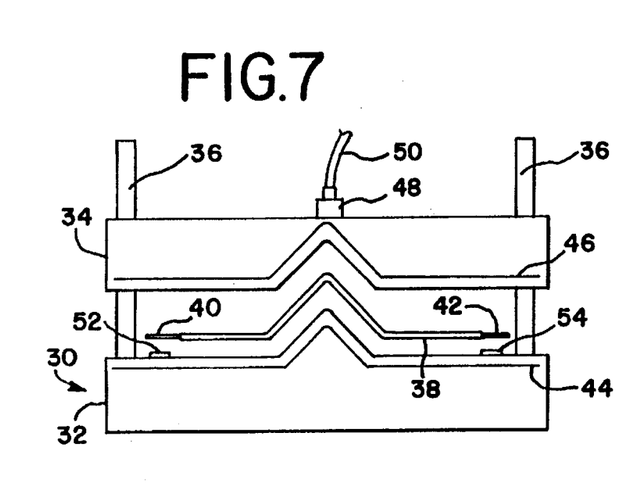
FIG. 7 discloses a cross-sectional view of a mold for forming a composite material part in an open position in accordance with another embodiment of the invention.

FIG. 7 discloses a cross-section of a mold 30 in an open position having a first mold half or portion 32, and a second mold half or portion 34. The mold halves 32,34 are supported and guided by posts 36; however a clam shell type mold, or other known configurations can be used. The mold 30 is configured to hold and compress a part 38 formed from a composite material which includes at least one layer of conductive fibers. The preferred forms of the composite material are described in more detail below.

Similar to the composite material part 38, each of the mold halves 32,34 include at least one layer of conductive fibers 44,46. The conductive layers 44,46 in the mold halves 32,34, along with the conductive layer in the composite material part 38 are utilized to provide resistive heating during the curing process.

The composite material part 38 may be preimpregnated with a heat curable resin, and then placed in the mold 30. Alternatively, the resin may be injected directly into the composite material after the part 38 is placed in the mold 30. In this case, the mold 30 is equipped with an injection port 48 which is connected by a tube 50 to a reservoir of resin (not shown).

Figure 8:
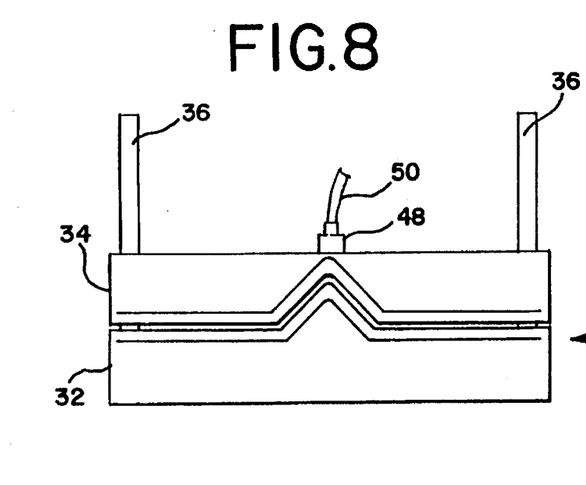
FIG. 8 discloses a cross-sectional view of the mold of FIG. 7 in a closed position.

Once the composite material 38 is placed in the mold 30, the mold halves 32,34 are clamped shut as shown in FIG. 8. At this point resin would be injected into the composite material 38 if it was not preimpregnated with the resin. A power generator 54 (not shown) is used to supply Current to the conductive layers 44,46 in the mold halves 32,34 and to the conductive layer in the composite material 38. The composite material part 38 includes exposed sections 40,42 of the conductive fibers in the part 38 which are placed in line with electrical contacts 52,54 in the mold in order to allow for electrical contact with the power generator 54. Preferably, the mold 30 includes connections so that the conductive layers 44,46 in the mold 30 and the conductive layer in the composite material 38, are placed in series. Alternatively, separate connections can be made to these layers. This is important when it is necessary to supply different currents to the layers as described below.

The currents flowing through the conductive layers 44,46 of the mold 30 and the composite material resistively heat the mold and the composite material in order to cure the resin in the material. Once cured, the part may be removed from the mold.

In the preferred form of this embodiment of the invention, the mold 30 is constructed from the same or similar material as the composite material part 38. This ensures that the thermal characteristics of the mold 30 match those of the composite material part 38 being cured. This helps ensure a more uniform part production with less rejects. If the thermal characteristics of the mold 30 match that of the part 38 (i.e., have approximately the same coefficient of thermal expansion), then during the curing process where the mold 30 and part 38 are resistively heated, the mold will stay in close contact with the part 38 throughout the process since it will expand and contract at the same rate as the part 38. This ensures that a uniform pressure is applied to the part 38 throughout the curing cycle, and that the part will not pull away from the mold 30 or warp. Such warpage may happen in those cases where the mold does not expand and contract at the same rate as the part 38. By providing conductive layers 44,46 in the mold, this helps ensure that the heat distribution in the mold 30 is similar to that of the part 38.

Although it is preferred to construct the mold from the same composite material as the part 38 (especially since such molds can be made for much less cost than the metal molds currently available), this method may still be practiced if the mold 30 is made from a different material if the coefficient of thermal expansion of such material is known. In such instances, the power supplied to the mold 30 is regulated so that the mold 30 heats (or cools after reaching cure temperatures) in manner that the mold 30 expands (or contracts) at the same rate as the composite material part 38.

By matching the thermal characteristics of the mold 30 and the composite material part 38 a more consistent, better quality finished part 38 is produced. Further, molds 30 made in accordance with this embodiment are less expensive than metal molds and require less power to heat.

Open Mold Parts

Large structural composite material parts, such as boat hulls, trailer side walls, and walls for utility buildings are typically impregnated with a resin system which cures at a low temperature (e.g., 77° F.) and are cured in large open molds which conform to and support the bottom of the part while leaving the top of the part exposed. As mentioned above, this is referred to as an ambient cure, in that ambient temperature is used to effect the cure. Since the cure is dependent on ambient temperature, various problems are associated with production of such parts. If the ambient temperature is too cold, the part will not cure, allowing the resin to migrate to the bottom of the part until raised to a sufficient temperature. Alternatively, if the ambient temperature is too hot, the resin will cure before it is thoroughly impregnated in the composite material.

A higher temperature resin system can be utilized with such parts provided that there is some means to heat the part to a temperature sufficient to cure the resin. However, molds capable of heating such parts, as is done with smaller parts, are extremely expensive considering the large size of the parts. Open molds can be used in combination with copper heating blankets which are placed over the part in the mold. However, this method is undesirable since the heating blankets are cumbersome and require a great deal of power since a large amount of heat is dissipated into the atmosphere. Also, since the blankets on top of the part, they must be kept in place for a long period of time to ensure that the entire part has cured. These problems are overcome with the present invention.

Figure 9:
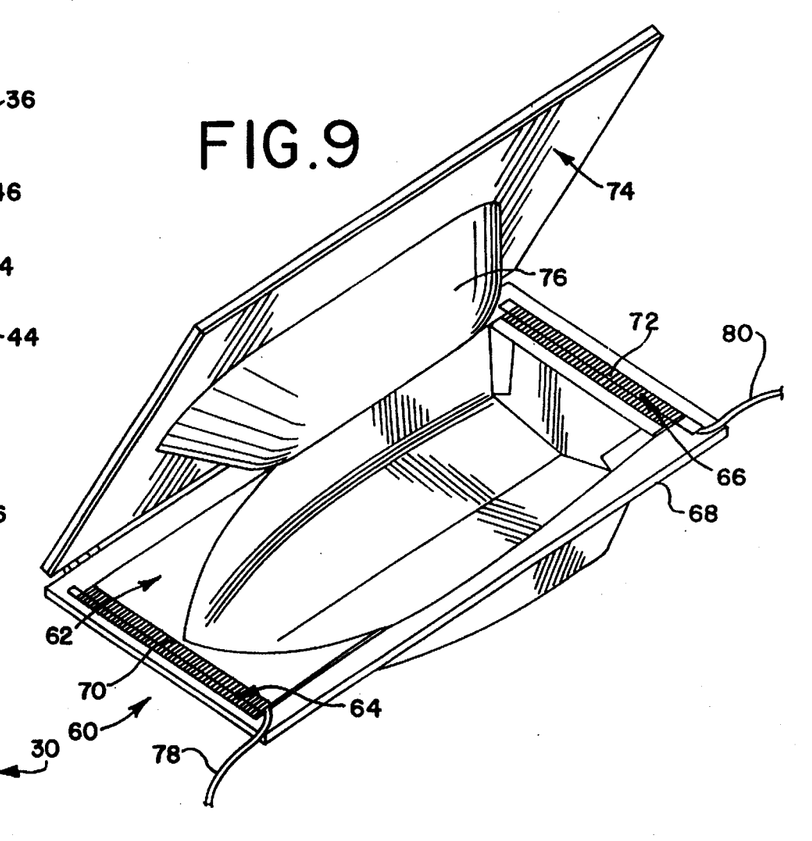
FIG. 9 discloses a perspective view of a mold for forming a composite material part in accordance with another embodiment of the invention.

FIG. 9 discloses an open mold 60 having a lower portion 68 configured to support a composite material part 62 in the shape of a boat hull. The mold includes electrical contacts 64,66 built into the mold 60 at opposite ends.

A composite material part 62 which includes a layer of conductive fibers is preformed into the boat hull shape and impregnated with a heat curable resin having a high cure temperature (e.g., 125°–150° F.). The conductive fibers are integrally consolidated into the composite material. The composite material part 62 is placed in the lower portion 68 of the mold 60. The composite material part 62 includes two exposed portions 70,72 of the conductive layer which coincide with the contacts 64,66 in the mold 60.

A top portion 74 of the mold 60 which supports a flexible membrane 76 is placed over the composite material part 62. A vacuum is created by a pump (not shown) between the membrane and the composite material part 62 through ports (not shown) in the mold 60. The vacuum allows atmospheric pressure to compress and hold the part 62 during the curing operation.

To cure the part, a power generator (not shown) having first and a second lead 78,80 is connect to the mold 60 so that it is in electrical contact with the conductive fibers in the composite material part 62. The power generator is used to cause a current to flow through the conductive fibers of the composite material part 62 sufficient to resistively heat the part 62 to cure the resin. After the cure cycle is complete, the vacuum is released and the finished part is removed from the mold.

Figure 10:
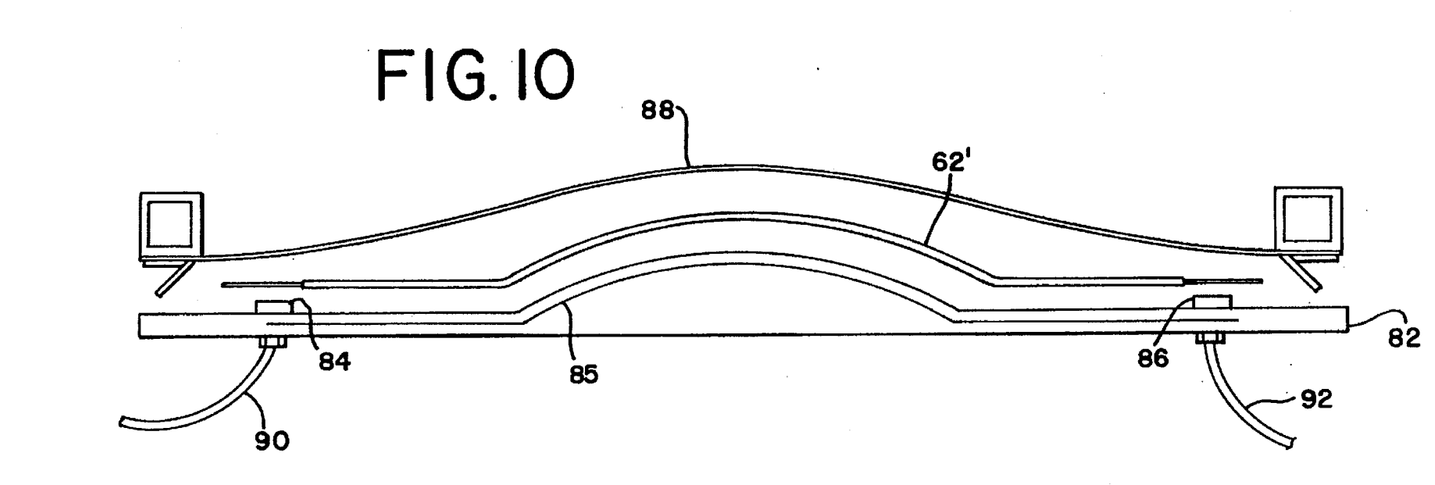
FIG. 10 discloses a cross-sectional view a flexible membrane being placed over a mold for forming a composite material part in accordance with another embodiment of the invention.
Figure 11:
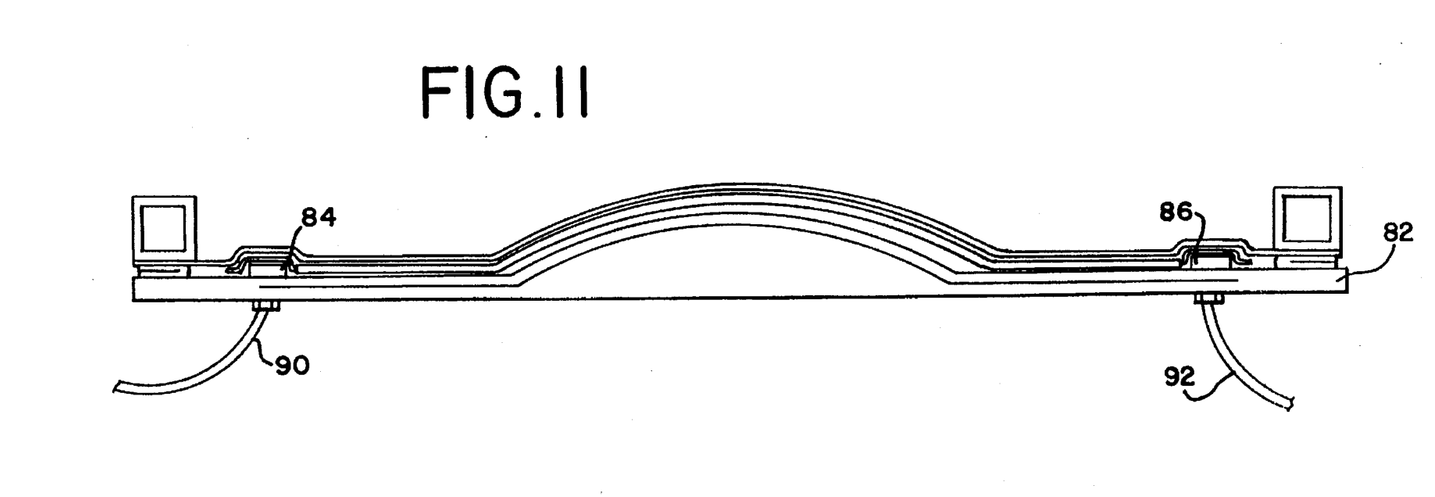
FIG. 11 discloses a cross-sectional view of the mold of FIG. 10 with the membrane in place.

In a second embodiment similar to the matched mold operations described above, an open mold 82, shown in cross-section in FIGS. 10–11 may include a layer of conductive fibers 85 and is preferably formed from the same material as a composite material part 62' to be cured. The open mold 82 also includes electrical contacts 84,86. The composite material part 62' includes a layer of conductive fibers and is impregnated with a heat curable resin. The conductive fibers in the composite material part 62' are exposed at either end to coincide with the contacts 84,86. A flexible membrane 88 is placed over the part 62' and a vacuum is effected between the part 62' and the membrane 88.

A power generator (not shown) is connected by leads 90,92 to the mold. The generator causes a current to flow through the conductive layer 84 of the mold 82 and the conductive fibers of the composite material part 62' to resistively heat the part 62' to cure the resin. As in the matched molds described above, the open mold 82 will thermally expand and contract at the same rate as the composite material part to ensure that close contact is maintained between the mold 82 and the part 62' during the cure cycle.

Hollow Parts

The present invention can also be used to form tubing and other hollow shaped composite material parts. Reference is made to FIG. 12–16 which disclose a process for forming such parts.

Figure 12:
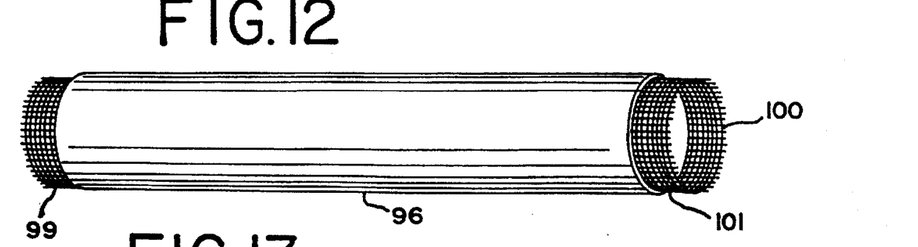
FIG. 12 discloses a perspective view of a composite material part in a tubular form in accordance with another embodiment of the invention.
Figure 13:
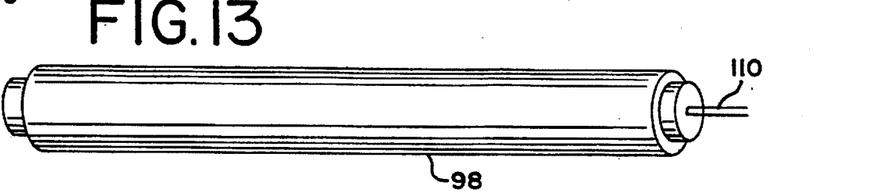
FIG. 13 discloses a perspective view of an inner mandrel which is placed in the composite material part of FIG. 12 in a method of forming the part.

A composite material part 96, shown in FIG. 12, is preformed into tubular shape and is position over an expandable mandrel or bladder 98, shown in FIG. 13. The composite material part 96 includes a layer of conductive fibers 100 which are integrally consolidated as part of the composite material. The conductive fibers 100 are exposed at opposite ends 99,101 of the part 96, and the composite material is impregnated with a heat curable resin system.

Figure 14:
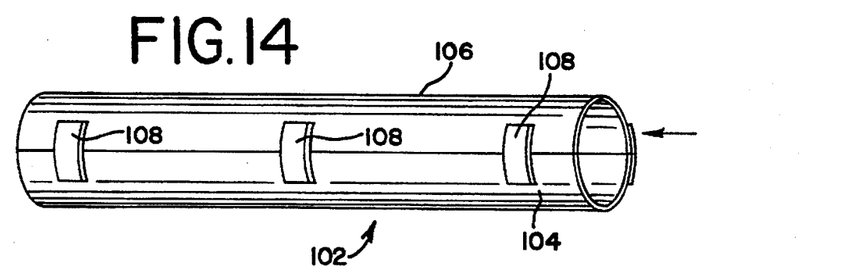
FIG. 14 discloses a perspective view of an outer shell for use in forming the composite material part of FIG. 12.
Figure 15:
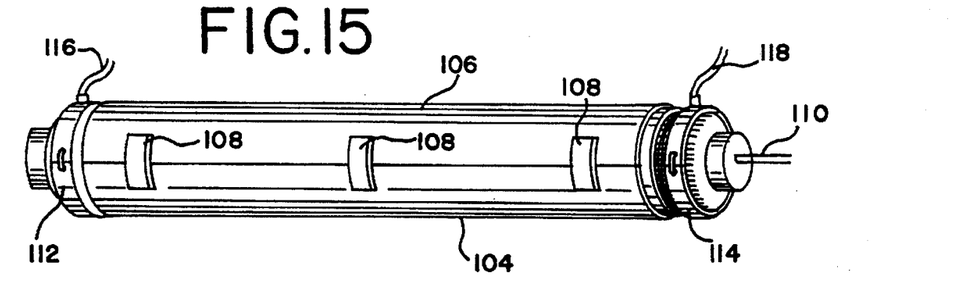
FIG. 15 discloses a perspective view of the composite material part and mandrel of FIGS. 12 and 13 in place in the shell of FIG. 14.
Figure 16:
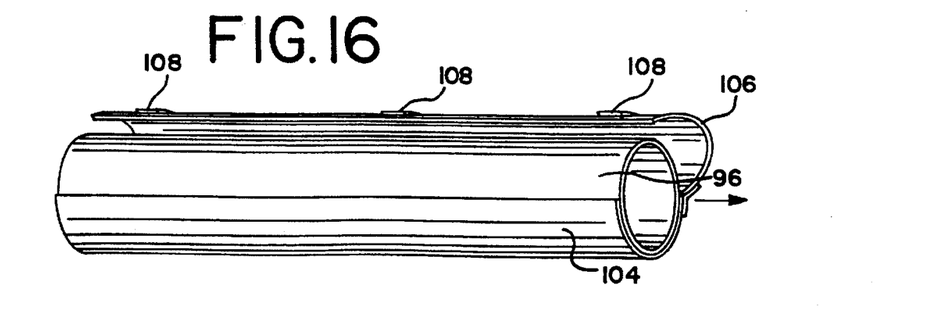
FIG. 16 discloses a perspective view of the shell of FIG. 14 in an open position.

The mandrel 98 and part 96 are then placed in an outer cylindrical forming shell 102 shown in FIG. 14. The shell includes a first portion 104 and a second portion 106 which are secured by clasps 108. The mandrel 98 is then inflated through a hose 110, to compress the composite material between the mandrel 98 and the shell 102. Electrical contact bands 112,114 of copper, or other suitable conducting material, are connected to the exposed portions 99,101 of the conductive fibers in the composite material part 96.

A power generator (not shown) is connected to the bands 112,114 by a first and second lead 116,118 to form an electric circuit. The generator is utilized to cause an electric current to flow through the conductive fibers 100 of the composite material part 86 to resistively heat the part to cure the impregnated resin. After the cure cycle, the part 96 is removed from the shell 98 and the mandrel 98 is collapsed and removed from the interior of the part 96. If desired, the part 96 can be injected with a hardening foam, such as an epoxy or urethane or polyester foam.

This method can also be used to form railroad ties from a composite material by placing the material in an outer shell having a rectangular shape.

Fiber Orientation

The methods described above can be optimized by orienting the conductive fabric so that the fibers acting as conducting fibers efficiently carry current through the entire composite material part while utilizing the smallest possible contacts. In fact, as explained below, further optimization can be obtained by providing a fabric having conducting fibers at an oblique angle with respect to the cross fibers of the fabric.

As described below, the conductive layers are preferably formed from woven conductive materials such as graphite. Such woven materials typically are formed on a loom with parallel fibers running in the machine direction, or length of the fabric, and parallel fibers running in the cross-machine direction, or width of the fabric. The cross-machine fibers form stitch bonding which holds the fabric together. The machine and cross-machine fibers run generally perpendicular to each other. When utilized as a conductive layer in a composite, either the fibers running in the machine direction or the cross-machine direction can act as conducting fibers to resistively heat the fabric. Such fabrics can be oriented to accommodate various shaped composite materials to achieve an effective cure with the smallest possible electric contact, which provides savings in power. However, creating and using fabrics where the machine direction fibers run at an oblique angle with respect to the cross-machine fibers, can result in a more efficient use of the fabric.

Figure 17:
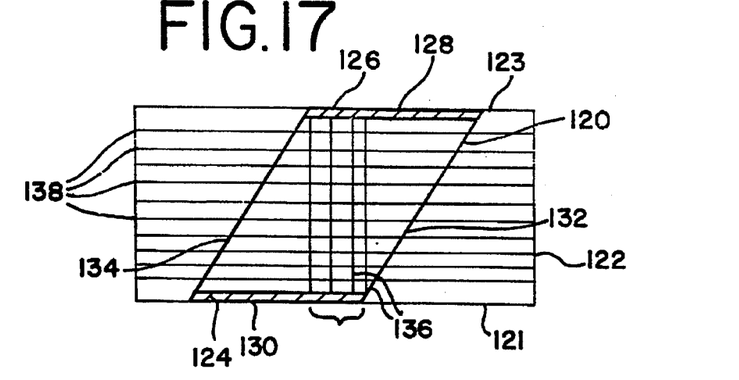
FIG. 17 discloses a top plan view of a composite material part in the shape of a parallelogram formed from a rectangular piece of material in accordance with another embodiment of the invention.

This principle can be illustrated by examining a composite material part 120 having a parallelogram shape as shown in FIG. 17, which runs from one side 121 of a rectangular piece of conductive fabric 122 to the other 123. Electrical contacts 124,126 are connected to opposing parallel sides 128,130 of the part 120. The opposing sides 128,130 are smaller than the remaining two sides of the part 132,134, and thus smaller contacts are needed. In this situation, the cross-machine fibers 136 are acting as conducting fibers. However, if the cross-machine fibers 136 are perpendicular to the machine fibers 138 of the fabric 122, the effective conductive path through the part 120 is limited, which results in an ineffective cure. Although it is possible to place electrical contacts along the remaining sides 132,134, of the part 120, which would provide a conductive path throughout the entire fabric using the machine direction fibers 138, which would be the conducting fibers, the larger size of the contacts would require greater power to effectively resistively heat the part 120.

Figure 18:
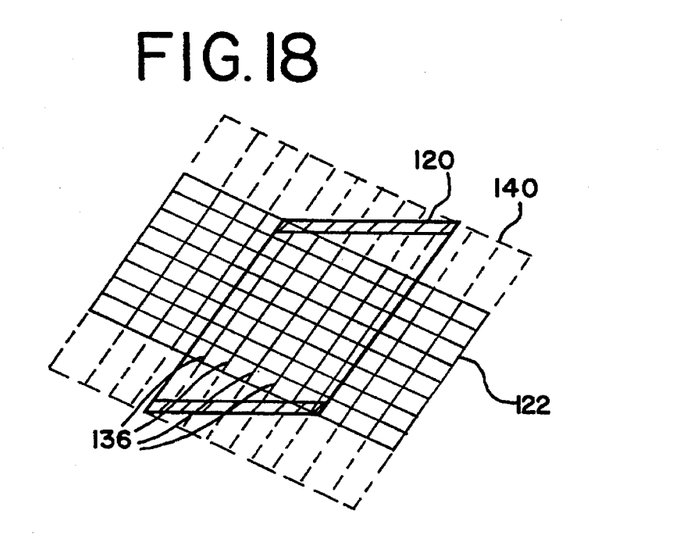
FIG. 18 discloses a top plan view of the composite material part of FIG. 17 with the rectangular fabric at a different angle with respect to the part than that in FIG. 17.
Figure 19:
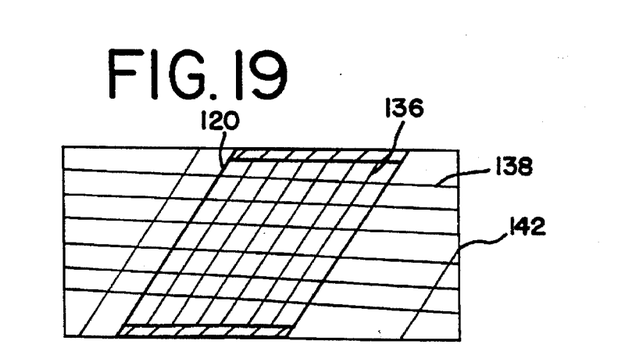
FIG. 19 discloses a top plan view of another embodiment of the composite material part of FIG. 17.

One way to obtain an effective cure with less power consumption is to orient the fabric 122 so that the cross-machine fibers 136 are parallel to the remaining sides 132,134 of the part 120, as shown in FIG. 18. This provides a conductive path throughout the part 120 while using the contacts 124,126. However, this method requires a wider piece of fabric 140 (shown in phantom) in order to cover the entire part 120. An alternative method, which would not require a larger sized fabric, is too create a piece of fabric 142 having conducting fibers oriented at an oblique angle with respect to machine direction fibers such as that shown in FIG. 19. Various combinations of these techniques can be used to minimize the number and size of electrical contacts necessary to provide for the most effective conductive path for parts of even more complex shapes.

Composite Structure

The composite materials used in the methods described above are preferably formed from a combination of low-cost resin carrying materials and high performance conductive materials. These materials are consolidated into an integrated composite material.

Figure 20:
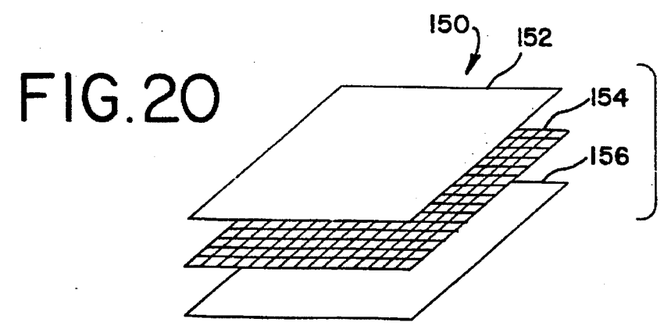
FIG. 20 discloses an exploded perspective view of a composite material made in accordance with the invention.

FIG. 20 discloses an exploded view of a composite material 150 having a first resin carrying layer 152, a second layer 154 of a conductive material, and a third resin carrying layer 156. The conductive second layer 154 is sandwiched between the first and third resin carrying layers 152,156.

Preferably, the resin carrying layers 152 and 156 are fabrics made from either 2–4 ounces per square yard of air layered non-woven fiberglass, Kevlar, polyester, or nylon. For those applications which require a smooth surface to the finished cured part, a spun-lace non-woven polyester or nylon fabric is preferred.

The conductive layer 154 can be formed from several different fabrics having conductive fibers. Factors such as the cost, strength and weight of the finished part can be taken into consideration when deciding on which fabrics are best suited for a particular application. One material which may be used is a plan weave graphite fiber fabric. Preferably, the fabric is approximately 6–9 ounces per square yard and includes 10 bundles of graphite fibers per square inch (this is known in the fabric industry as "10 pick") where each bundle has approximately 12,000 strands. A second fabric which may be utilized is a carbon black glass fabric which is preferably about 12 ounces per square yard. Alternatively, a third type of fabric may be used, such as a conductive polymer-coated fabric. Certain such polymers are described in an article by K. F. Schoch, Jr. "Update On Electrically Conductive Polymers and Their Applications" in the IEEE Electrical Insulation Magazine, May/June 1994, Vol. 10, No. 3.

A unique preferred form of the conductive layer can be formed by combining bundles of graphite fiber and bundles of conductive polymer coated fibers into a single fabric. For instance, five bundles of graphite can be combined with five bundles of polymer coated glass or nylon, to create a fabric having ten bundles per inch. The polymer is preferably polypyrrole or polyaniline which have a resistance of approximately 125–175 ohms. Such conductive layers are less expensive than pure graphite weaves, and require less current to resistively heat due to the higher resistance of the polymer coated fibers than that of the graphite.

Figure 21:
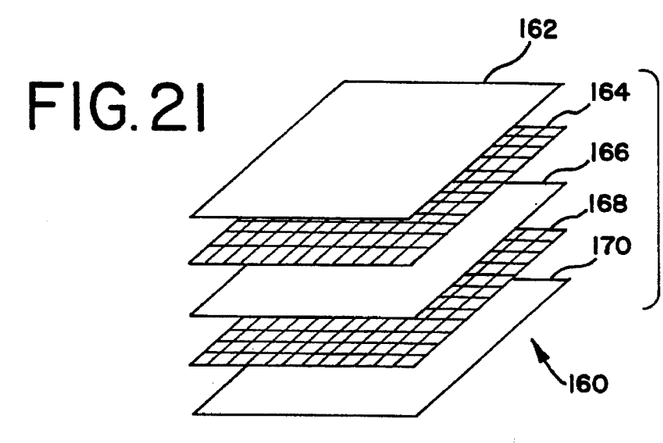
FIG. 21 discloses an exploded perspective view of another embodiment of a composite material made in accordance with the invention.

A second embodiment of a composite material 160 is disclosed in an exploded view in FIG. 21. This embodiment includes a first resin carrying layer 162, a second layer 164 of conductive material adjacent the first layer 162, a third resin carrying layer 166 adjacent the second layer 164, a fourth layer 168 of conductive material adjacent the third layer 166, and a fifth resin carrying layer 170 adjacent the fourth layer 168. The resin carrying layers and the conductive layers are formed from the same materials as described above. However, due to increased strength achieved in this embodiment, if the conductive layers are the plan graphite weave, it might not be necessary to have ten bundles of fibers per inch of fabric. Fewer bundles, such as six per square inch, may provide satisfactory physical characteristics in the finished composite material part.

As described above, the conductive layers in the composite material 160 can include a plurality of parallel fibers 171 which act as the conducting fibers when electrically resistively heating the composite material. The cross or stitch bonding fibers of the fabric may also act as conducting fibers in appropriate circumstances. With this in mind, FIG. 22 discloses an exploded view of a modified embodiment of the one disclosed in FIG. 21.

Figure 22:
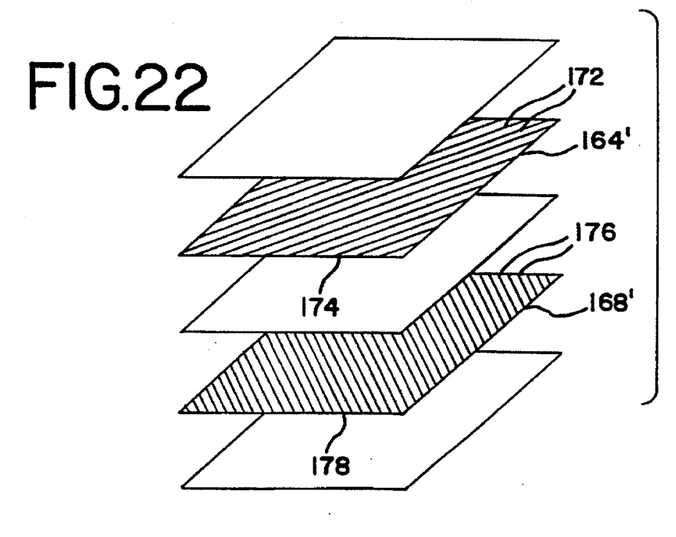
FIG. 22 discloses an exploded perspective view of another embodiment of a composite material made in accordance with the invention.

In FIG. 22, the second conductive layer 164' includes a plurality of conducting fibers 172 oriented at about a 45° angle with respect to the edge 174 of the layer 172. The fourth conductive layer 168' also includes a plurality of parallel conducting fibers 176. However, the conducting fibers 176 in the fourth layer 168' are oriented at about a 135° angle with respect to the edge 178 of the layer 168'. In this manner, a more effective resistive heat treatment can be utilized to ensure that all areas of the composite material 160 are sufficiently heated to cure impregnated resin. Orientation of the conducting fibers becomes more important as the complexity of the shape of the composite material increases.

Figure 23:
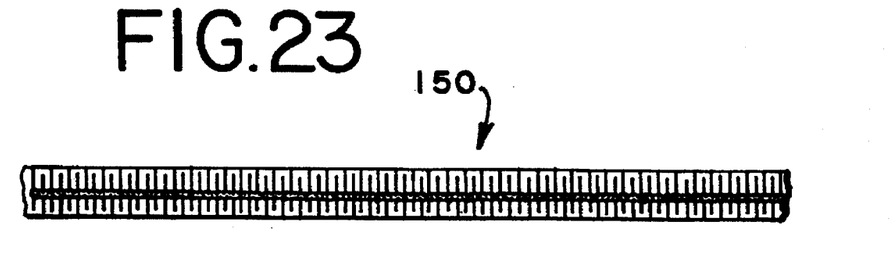
FIG. 23 discloses a cross sectional view of the composite material of FIG. 20.
Figure 24:
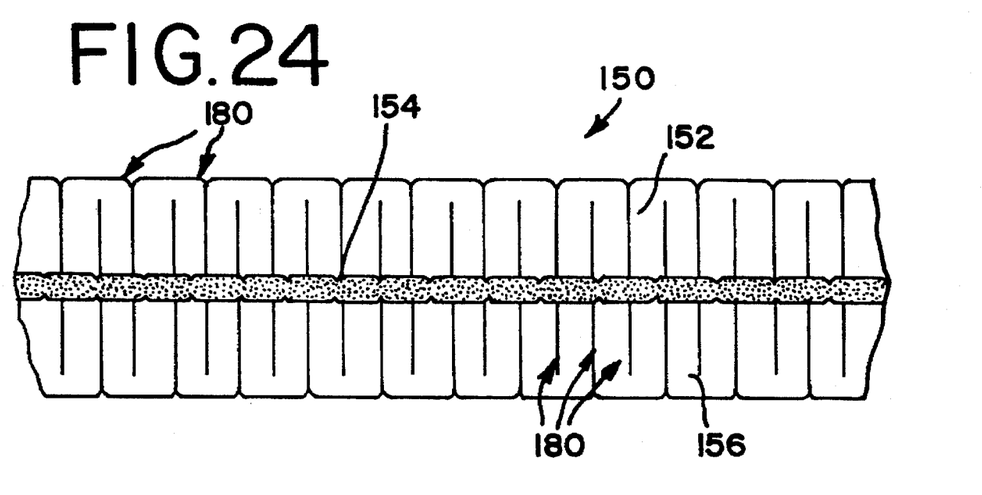
FIG. 24 discloses an enlarged cross sectional view of the composite material of FIG. 23.

The layers in all three embodiments, disclosed in FIGS. 20–22 are consolidated into a single composite material with the conducting layers being integrally a part of the material. This is preferably done by needle-punching the fabric layers to place a number of fibers 180 in the depth direction of the composite material. This is shown in FIGS. 23 and 24 with respect to the embodiment shown in FIG. 20; however, the embodiments shown in FIGS. 21 and 22 can also be consolidated in the same manner. Preferably, size HDB36 needles at 600 penetrations per square inch is sufficient to consolidate the layers. Also, it is preferred that the needle size be small enough so that material from the outer layers will fill the barb of the needle. In this manner, the needle will merely push through the conductive layers without substantially disrupting or snagging the electrical path created by the conducting fibers. The greater the penetrations per inch, the flatter the composite material will be.

Other methods of consolidating the composite material may also be used, such as stitch bonding, at preferably one inch intervals in the fill or cross-machine direction of the fabric, or knitting.

These consolidating procedures are preferred over prior laminants which are typically a plurality of layers glued together. Such glued together layers have a tendency of splitting and pealing apart when under stress.

Once consolidated, the composite material is impregnated with a heat curable resin which is then cured by resistive heat in the manner described above. Although a large variety of resin systems are currently available, the preferred systems for the uses described include either an iso polyester thermosetting resin or vinyl ester resin systems from Reichhold Corporation with an AKZO catalyst, or an epoxy system from Dow Chemical with an Air Products hardener or catalyst.

Improved strength in the cured composite part is achieved in the unique structure of the composite materials 160 and 160' disclosed in FIGS. 21 and 22. In the embodiments disclosed in FIGS. 21 and 22, the third resin carrying layers 166 and 166' act as a bulker layer which separates the second 164,164' and fourth 168,168' conductive layers. Since the conductive layer is formed from a high performance fabric such as woven graphite, it functions structurally as a load bearing layer in the composite material 160,160'. Separating the conductive layers has been found to increase the overall strength of the composite above that of a composite material where the two conductive layers are in close contact with each other. Accordingly, this bulker layer can be formed with relatively inexpensive materials while increasing the strength of the finished composite part.

While specific embodiments have been illustrated and described, numerous modifications come to mind without markedly departing from the spirit of the invention. The scope of protection is thus only intended to be limited by the scope of the accompanying claims.

What I claim is:

1. A high performance composite material part comprising a first layer capable of carrying a heat curable resin, a second electrically conductive layer, a third layer capable of carrying a heat curable resin, a fourth electrically conductive layer, said third layer disposed between said second electrically conductive layer and said fourth electrically conductive layer, and a fifth layer capable of carrying a heat curable resin, said layers connected together and impregnated with a heat curable resin.

2. The composite of claim 1 wherein said first layer is a non-woven fiberglass fabric.

3. The composite of claim 1 wherein said first layer is a non-woven polyester fabric.

4. The composite of claim 1 wherein said first layer is a non-woven nylon fabric.

5. The composite of claim 1 wherein said second layer is a graphite fabric.

6. The composite of claim 5 wherein said graphite fabric is a plain weave having approximately 6 bundles of graphite per inch, each of said bundles having approximately 12,000 strands of graphite fibers.

7. The composite of claim 1 wherein said second layer comprises carbon black glass.

8. The composite of claim 1 wherein said second layer comprises a conductive polymer coated nylon fiber fabric.

9. The composite of claim 8 wherein said conductive polymer is polyaniline.

10. The composite of claim 1 wherein said layers are connected by stitch bonding.

11. The composite of claim 1 wherein said layers are connected by a needle punching operation.

12. The composite of claim 1 wherein said resin is in cured state.

13. The composite of claim 1 wherein said second layer includes a plurality of parallel conducting fibers, and said fourth layer includes a plurality of parallel conducting fibers which are at an angle with respect to said conducting fibers in said second layer.

14. A high performance composite material part comprising a first electrically conductive layer, a second electrically conductive layer, and a third layer capable of carrying a heat curable resin disposed between said first layer and said second layer, said first, second and third layers connected together and impregnated with a heat curable resin.

15. The composite of claim 14, wherein said first layer is a graphite fabric.

16. The composite of claim 14, wherein said third layer is a non-woven polyester fabric.

17. The composite of claim 14, wherein said third layer is a conductive polymer coated nylon fabric.

18. The composite of claim 14, wherein said layers are connected by a needle punching operation.

19. The composite of claim 14, wherein said layers are connected by stitch bonding.

20. A composite material part comprising a first electrically conductive layer having a plurality of parallel conducting fibers, a second layer capable of carrying a heat curable resin, and a third electrically conductive layer having a plurality of parallel conducting fibers which are at an angle with respect to said parallel conducting fibers of said first layer, said first, second and third layers connected together and impregnated with a heat curable resin.

21. The composite of claim 20, wherein said first layer is a graphite fabric.

22. The composite of claim 14, wherein said second layer is a non-woven polyester fabric.

23. The composite of claim 20, wherein said layers are connected by a needle punching operation.

* * * * *